US012149166B2

(12) United States Patent
Nakashima et al.

(10) Patent No.: US 12,149,166 B2
(45) Date of Patent: Nov. 19, 2024

(54) DC-DC CONVERTER HAVING CONTROL UNIT FOR INTERMITTENT CHARGING A CAPACITOR

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Arata Nakashima, Yokkaichi (JP); Takeshi Hasegawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/754,580

(22) PCT Filed: Aug. 28, 2020

(86) PCT No.: PCT/JP2020/032564
§ 371 (c)(1),
(2) Date: Apr. 6, 2022

(87) PCT Pub. No.: WO2021/070506
PCT Pub. Date: Apr. 15, 2021

(65) Prior Publication Data
US 2024/0088781 A1    Mar. 14, 2024

(30) Foreign Application Priority Data
Oct. 10, 2019    (JP) .................................. 2019-186578

(51) Int. Cl.
*H02M 3/158*    (2006.01)
*H02M 1/32*    (2007.01)

(52) U.S. Cl.
CPC .......... *H02M 1/322* (2021.05); *H02M 3/1582* (2013.01)

(58) Field of Classification Search
CPC ..................................................... H02M 1/322
See application file for complete search history.

(56) References Cited

U.S. PATENT DOCUMENTS 6,031,743 A * 2/2000 Carpenter ............... H02J 1/001
363/124
2016/0190932 A1* 6/2016 Yu ....................... H02M 3/1582
323/271

(Continued)

FOREIGN PATENT DOCUMENTS

JP    2006-296148 A    10/2006
JP    2018-61438 A    4/2018

OTHER PUBLICATIONS

International Search Report, Application No. PCT/JP2020/032564, mailed Oct. 27, 2020. ISA/Japan Patent Office.

*Primary Examiner* — Peter M Novak
(74) *Attorney, Agent, or Firm* — Honigman LLP

(57) ABSTRACT

A DC-DC converter includes a first capacitor and a second capacitor provided between one of a first conductive path and a second conductive path and a reference conductive path, a first switch and a second switch interposed between a first external power source and the first capacitor and between a second external power source and the second capacitor, and a control unit configured to switch the first switch and the second switch between an ON state and an OFF state, whereby the control unit, in the case of switching from shut-off control in which the first switch and the second switch are kept in the OFF state to energization control in which the first switch and the second switch are kept in the ON state, performs intermittent control in which the first (Continued)

switch and the second switch are intermittently switched to the ON state prior to the energization control.

11 Claims, 5 Drawing Sheets

(56) References Cited

U.S. PATENT DOCUMENTS

2018/0287494 A1 10/2018 Yano et al.
2020/0031240 A1* 1/2020 Albrecht ................ B60L 3/003

* cited by examiner

DC-DC CONVERTER HAVING CONTROL UNIT FOR INTERMITTENT CHARGING A CAPACITOR

CROSS-REFERENCE TO RELATED APPLICATIONS

This application is the U.S. national stage of PCT/JP2020/032564 filed on Aug. 28, 2020, which claims priority of Japanese Patent Application No. JP 2019-186578 filed on Oct. 10, 2019, the contents of which are incorporated herein.

TECHNICAL FIELD

The present disclosure relates to a DC-DC converter.

BACKGROUND

Conventionally, DC-DC converters provided with a capacitor on a conductive path on the input side or output side are known. For example, in a DC-DC converter disclosed in JP 2018-61438A, an input-side capacitor is electrically connected to the input-side conductive path, and an output-side capacitor is electrically connected to the output-side conductive path.

DC-DC converters readily employ a configuration in which a switch is interposed between an external power source and a capacitor.

For example, conventionally, DC-DC converters have been proposed in which a shut-off switch is provided on the conductive path on the input side or the conductive path on the output side assuming a short-circuit failure in the circuit. This type of DC-DC converter can employ a configuration in which a shut-off switch is interposed between an external power source provided on the input side or output side and a capacitor electrically connected to a conductive path. In a DC-DC converter that employs such a configuration, when the shut-off switch switches from OFF to ON with the capacitor not sufficiently charged, a large inrush current is likely to flow through the capacitor in response to the switch switching ON. Note that with DC-DC converters in which a switch is interposed between an external power source and a capacitor, a similar problem can occur in other cases not only in the example given above.

In view of this, the disclosure provides a technology that can suppress inrush current flowing to a capacitor in a DC-DC converter.

SUMMARY

A DC-DC converter according to one mode of the disclosure includes: a voltage conversion unit, a capacitor, a switch and a control unit. The voltage conversion unit is provided between a first conductive path and a second conductive path. The capacitor is provided between one of the first conductive path and the second conductive path and a reference conductive path. The switch is interposed between an external power source and the capacitor. The control unit is configured to switch the switch between an ON state and an OFF state, whereby flow of current from the external power source to the capacitor is shut off when the switch is in the OFF state, and current is at least allowed to flow from the external power source to the capacitor via the one conductive path when the switch is in the ON state, and the control unit, in a case of switching from shut-off control in which the switch is kept in the OFF state to energization control in which the switch is kept in the ON state, performs intermittent control in which the switch is intermittently switched to the ON state prior to the energization control.

Advantageous Effects of Invention

A DC-DC converter according to one mode of the disclosure is able to suppress inrush current flowing to a capacitor.

DETAILED DESCRIPTION OF PREFERRED EMBODIMENTS

Figure 1:
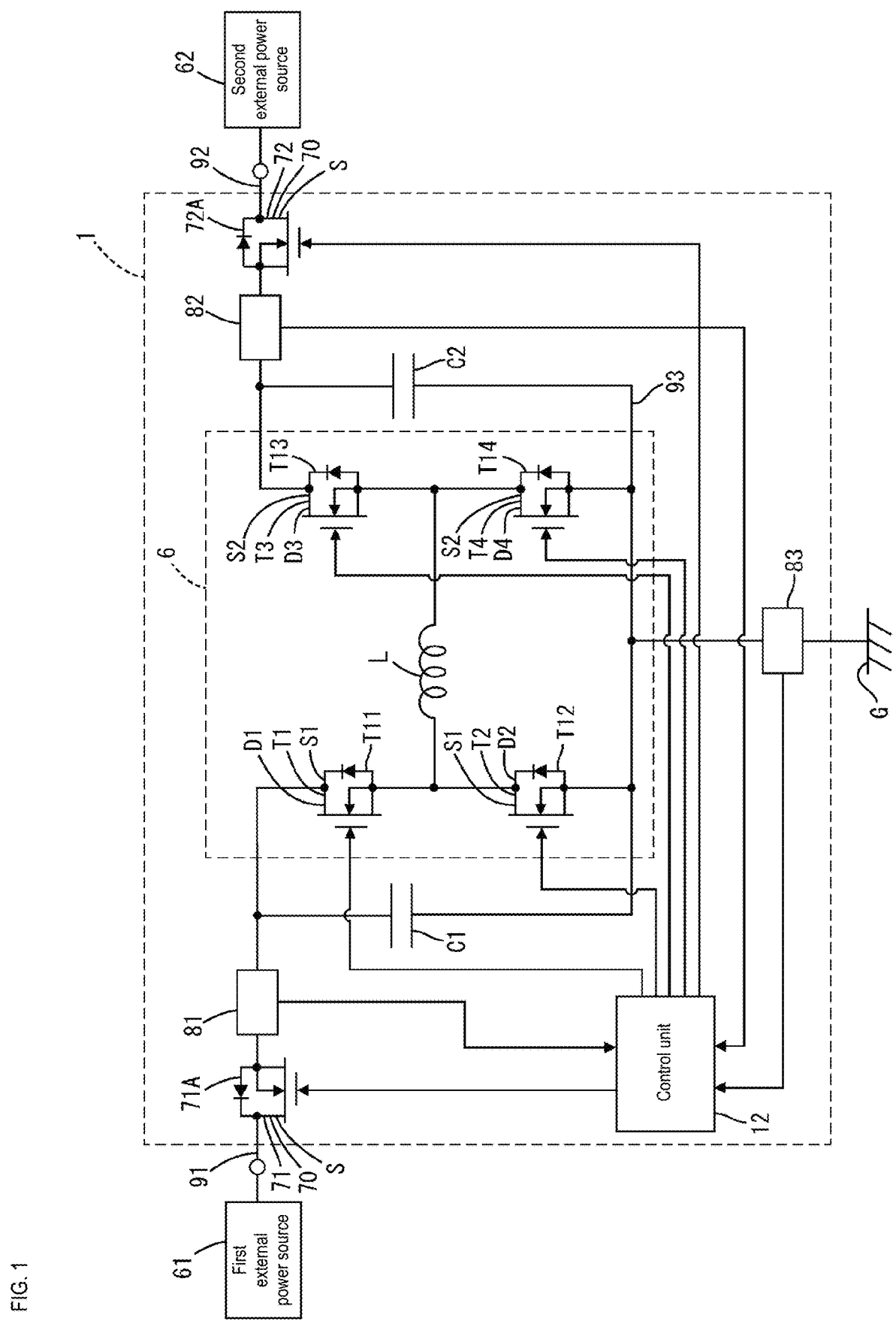
FIG. 1 is a circuit diagram showing a DC-DC converter of a first embodiment.

Initially, modes for carrying out the invention will be enumerated and described.

In a first aspect, a DC-DC converter according to one mode of the disclosure includes a voltage conversion unit, a capacitor, a switch and a control unit. The voltage conversion unit is provided between a first conductive path and a second conductive path. The capacitor is provided between one of the first conductive path and the second conductive path and a reference conductive path. The switch is interposed between an external power source and the capacitor. The control unit is configured to switch the switch between an ON state and an OFF state. Flow of current from the external power source to the capacitor is shut off when the switch is in the OFF state. Current is at least allowed to flow from the external power source to the capacitor via the one conductive path when the switch is in the ON state. The control unit, in a case of switching from shut-off control in which the switch is kept in the OFF state to energization control in which the switch is kept in the ON state, performs intermittent control in which the switch is intermittently switched to the ON state prior to the energization control.

Since the DC-DC converter having the configuration of the first aspect above executes intermittent control when switching the switch from shut-off control to energization control, inrush current flowing through the capacitor can be better suppressed than in the case of starting the energization control at the end timing of the shut-off control. Therefore, with the above DC-DC converter, problems caused by excessive inrush current flowing through the capacitor at the time of releasing the shut-off control can be made less likely to occur.

In a second aspect, the DC-DC converter according to the first aspect above may further be a DC-DC converter with the following additional features. The switch may include a shut-off switch provided on the one conductive path between the external power source and the voltage conversion unit. The shut-off switch may be configured to allow energization from the external power source side to the voltage conversion unit side when in the ON state, and to shut off the energization from the external power source side to the voltage conversion unit side when in the OFF state.

The DC-DC converter configured as described in the second aspect above is able to suppress excessive current at the time of shut-off control release using a shut-off switch necessary for a protection function, while keeping special dedicated components and the like from increasing in number. Therefore, this DC-DC converter is able to suppress inrush current to the capacitor with a simpler configuration.

In a third aspect, the DC-DC converter according to the first aspect above may further be a DC-DC converter with the following additional features. The switch can include a first shut-off switch provided on the first conductive path between a first external power source and the voltage conversion unit and a second shut-off switch provided on the second conductive path between a second external power source and the voltage conversion unit. The first shut-off switch can allow energization from the first external power source side to the voltage conversion unit side when in the ON state, and can shut off energization from the first external power source side to the voltage conversion unit side when in the OFF state. The second shut-off switch can allow energization from the second external power source side to the voltage conversion unit side when in the ON state, and can shut off energization from the second external power source side to the voltage conversion unit side when in the OFF state. The control unit, in a case of switching from first shut-off control in which the first shut-off switch is kept in the OFF state to first energization control in which the first shut-off switch is kept in the ON state, can perform first intermittent control in which the first shut-off switch is intermittently switched to the ON state prior to the first energization control. The control unit, in a case of switching from second shut-off control in which the second shut-off switch is kept in the OFF state to second energization control in which the second shut-off switch is kept in the ON state, can perform second intermittent control in which the second shut-off switch is intermittently switched to the ON state prior to the second energization control.

The DC-DC converter according to the third aspect above can achieve protection on the first conductive path and second conductive path by providing a shut-off switch on both conductive paths. Furthermore, this DC-DC converter is able to suppress inrush current flowing from the external power source to the capacitor, even in the case where shut-off control is released by the shut-off switch of one of the first conductive path and second conductive path, while realizing such a protection function.

In a fourth aspect, the DC-DC converter according to any one of the first to the third aspects above may be a DC-DC converter in which the switch includes a semiconductor switch forming part of the voltage conversion unit.

The DC-DC converter according to the fourth aspect above is able to suppress excessive current at the time of shut-off control release using a semiconductor switch necessary for realizing the functions of the voltage conversion unit, while keeping special dedicated components and the like from increasing in number. Therefore, this DC-DC converter is able to suppress inrush current to the capacitor with a simpler configuration.

In a fifth aspect, the DC-DC converter according to any one of the first aspect to the fourth aspect above may be a DC-DC converter with the following additional features. The control unit can set an ON period of the switch in a partial period of an entire period for performing the intermittent control to longer than the ON period of the switch in a period earlier than the partial period.

When the period of each ON state (hereinafter, also referred to as the ON period) is constant in the intermittent control, the current flowing through the capacitor in each ON period decreases as the ON state is repeated. This phenomenon contributes to lengthening the charging time of the capacitor. In contrast, the DC-DC converter according to the fifth aspect above sets the ON period to be relatively longer in partial periods that are relatively later, and is thus able to suppress the decrease in current caused by repetition of the ON state. Therefore, the DC-DC converter is able to complete charging of the capacitor earlier, while realizing the function of suppressing inrush current to the capacitor.

In a sixth aspect, the DC-DC converter according to any one of the first aspect to the fifth aspect above may be a DC-DC converter with the following additional features. The voltage conversion unit can include a drive switching element, and can step up or step down a voltage applied to one of the first conductive path and the second conductive path in response to ON/OFF operation of the drive switching element and applies an output voltage to the other conductive path. The control unit can perform voltage conversion control in which the drive switching element is switched ON/OFF, and can set a frequency of ON/OFF operation of the switch in the intermittent control to greater than a frequency of ON/OFF operation the drive switching element in the voltage conversion control.

The DC-DC converter according to the sixth aspect above is able to increase the frequency of ON/OFF operation of the switch during intermittent control to be greater than the frequency of ON/OFF operation of the drive switching element at the time of voltage conversion control. That is, this DC-DC converter is able to further shorten each ON period during intermittent control, and to further reduce the current flowing through the capacitor in each ON period during intermittent control. Therefore, this DC-DC converter is able to more reliably suppress inrush current to the capacitor.

In a seventh aspect, the DC-DC converter according to any one of the first aspect to the sixth aspect above may also be a DC-DC converter in which the capacitor is a ceramic capacitor.

Ceramic capacitors can be made compact compared with electrolytic capacitors with the same electrical characteristics. On the other hand, ceramic capacitors have a low internal resistance compared with electrolytic capacitors. Thus, due to the internal resistance being low, inrush current tends to readily increase compared with electrolytic capacitors. The DC-DC converter according to the seventh aspect above is able to favorably suppress the magnitude of inrush current to the capacitor in one ON state by performing intermittent control, even in the case where ceramic capacitors are used.

In an eighth aspect, even with the DC-DC converter according to any one of the first aspect to the seventh aspect above, the reference conductive path is desirably kept at a reference potential lower than the potential of the one conductive path.

In a ninth aspect, the DC-DC converter according to the second aspect above, the control unit switches the shut-off switch to OFF in the case where the current rises to a threshold value or the voltage falls to a threshold value on the one conductive path.

First Embodiment

Overview of DC-DC Converter 1

The DC-DC converter 1 shown in FIG. 1 is, for example, constituted as a step-up/down DC-DC converter for in-vehicle use, and is configured to step up or step down the DC voltage applied to one of a first conductive path 91 and a second conductive path 92 and output the resultant voltage to the other conductive path.

The DC-DC converter 1 includes the first conductive path 91 and the second conductive path 92 serving as power lines. The first conductive path 91 is a wiring that is electrically connected to a terminal on the high potential side of a first external power source 61, and is in continuity with this terminal on the high potential side. A predetermined DC voltage is applied to the first conductive path 91 from the first external power source 61. The second conductive path 92 is a wiring that is electrically connected to the terminal on the high potential side of a second external power source 62, and is in continuity with this terminal on the high potential side. A predetermined DC voltage is applied to the second conductive path 92 from the second external power source 62.

In the present disclosure, "electrically connected" is desirably a configuration in which the connection partners are connected in a state where they are in continuity with each other (a state allowing current to flow) such that the potentials thereof are the same. The disclosure is, however, not limited to this configuration. For example, "electrically connected" may be a configuration in which the connection partners are connected in a state where they can be in continuity with each other, with an electrical component interposed between the two connection partners.

The first external power source 61 and the second external power source 62 are constituted by known power storage means such as a lead-acid battery, a lithium-ion battery, an electric double layer capacitor, a lithium-ion capacitor or other power storage unit. The specific values of the output voltage of the first external power source 61 and the output voltage of the second external power source 62 are not particularly limited. The terminals on the low potential side of the first external power source 61 and the second external power source 62 are electrically connected to ground (not shown) and kept at a predetermined ground potential (0 V).

The DC-DC converter 1 includes a voltage conversion unit 6, a first capacitor C1, a second capacitor C2, a shut-off switch 70, a first current detection unit 81, a second current detection unit 82, a third current detection unit 83, a first voltage detection unit, a second voltage detection unit and a control unit 12.

The voltage conversion unit 6 has a function of stepping up or stepping down the voltage applied to one of the first conductive path 91 and the second conductive path 92 and applying the output voltage to the other thereof in response to ON/OFF operation of semiconductor switches T1, T2, T3 and T4. The voltage conversion unit 6 is provided between the first conductive path 91 and the second conductive path 92. The voltage conversion unit 6 can perform a first conversion operation and a second conversion operation. The first conversion operation is at least one of an operation for stepping down the voltage applied to the first conductive path 91 and applying the resultant voltage to the second conductive path 92 and an operation for stepping up the voltage applied to the second conductive path 92 and applying the resultant voltage to the first conductive path 91. The second conversion operation is at least one of an operation for stepping up the voltage applied to the first conductive path 91 and applying the resultant voltage to the second conductive path 92 and an operation for stepping down the voltage applied to the second conductive path 92 and applying the resultant voltage to the first conductive path 91.

The voltage conversion unit 6 includes the semiconductor switch T1, T2, T3 and T4 disposed in an H-bridge structure and an inductor L, and functions as a DC-DC converter that executes so-called bidirectional stepping up/down. The semiconductor switches T1, T2, T3 and T4 are all constituted as N-channel MOSFETs. The semiconductor switch T1 is a first high-side element. The semiconductor switch T2 is a first low-side element. The semiconductor switch T3 is a second high-side element. The semiconductor switch T4 is a second low-side element. The semiconductor switches T1 and T2 constitute a first switch unit S1. The semiconductor switches T3 and T4 constitute a second switch unit S2.

A configuration is adopted in which parasitic diodes T11, T12, T13 and T14, which are parasitic components, are respectively provided in the semiconductor switches T1, T2, T3 and T4. Specifically, with the semiconductor switches T1, T2, T3 and T4, a configuration is adopted in which the cathodes and anodes of the parasitic diodes T11, T12, T13 and T14 are electrically connected respectively to the drain side and source side of the semiconductor switches. The inductor L is constituted as a known coil having a predetermined inductance.

In the voltage conversion unit 6, the first conductive path 91 is electrically connected to the drain of the semiconductor switch T1, and the drain of the semiconductor switch T2 and one end of the inductor L are electrically connected to the source of the semiconductor switch T1. The second conductive path 92 is electrically connected to the drain of the semiconductor switch T3, and the drain of the semiconductor switch T4 and the other end of the inductor L are electrically connected to the source of the semiconductor switch T3. The sources of the semiconductor switches T2 and T4 are electrically connected to ground G via a reference conductive path 93. Drive signals such as PWM signals are input from the control unit 12 to the gates of the semiconductor switches T1, T2, T3 and T4. The reference conductive path 93 is a conductive path that is kept at a reference potential (potential of ground G) that is lower than the potentials of the first conductive path 91 and the second conductive path 92.

The first capacitor C1 is provided to be interposed between the first conductive path 91 and the reference conductive path 93. Specifically, one terminal of the first capacitor C1 is electrically connected to the first conductive path 91, and the other terminal is electrically connected to the reference conductive path 93.

The second capacitor C2 is provided to be interposed between the second conductive path 92 and the reference conductive path 93. Specifically, one terminal of the second capacitor C2 is electrically connected to the second conductive path 92, and the other terminal is electrically connected to the reference conductive path 93. Ceramic capacitors or film capacitors, for example, are used for the first capacitor C1 and the second capacitor C2. The internal resistance of ceramic capacitors and film capacitors tends to be low compared with electrolytic capacitors. Electrolytic capacitors may also be used for the first capacitor C1 and the second capacitor C2.

The shut-off switch 70 has a first shut-off switch 71 and a second shut-off switch 72. The first shut-off switch 71 is constituted as an N-channel MOSFET, for example. Specifically, the first shut-off switch 71 is configured to switch between an ON state allowing bidirectional energization on the first conductive path 91 and an OFF state shutting off energization on the first conductive path 91 in a direction from the first external power source 61 toward the voltage conversion unit 6 side. The first shut-off switch 71 is interposed on the first conductive path 91, and one end side (source) thereof is electrically connected to the voltage conversion unit 6 and one terminal of the first capacitor C1. The other end side (drain) of the first shut-off switch 71 is configured to be electrically connected to the first conductive path 91 on the first external power source 61 side, and to be switched between the ON state and the OFF state by the control unit 12. That is, the first shut-off switch 71 is provided on the first conductive path 91 between the first external power source 61 and the voltage conversion unit 6.

The first shut-off switch 71 is a switch S that is interposed between the first external power source 61 and the first capacitor C1. The first shut-off switch 71, when ON, at least allows energization from the first external power source 61 to the voltage conversion unit 6 side, and allows current to flow to the first capacitor C1. The first shut-off switch 71, when OFF, shuts off energization from the first external power source 61 to the voltage conversion unit 6 side, and shuts off the flow of current to the first capacitor C1. A parasitic diode 71A is electrically connected to the first shut-off switch 71. A configuration is adopted in which the anode of the parasitic diode 71A is electrically connected to the voltage conversion unit 6, and the cathode is electrically connected to the first conductive path 91 on the first external power source 61 side.

The second shut-off switch 72 is constituted as an N-channel MOSFET, for example. Specifically, the second shut-off switch 72 is configured to switch between an ON state allowing bidirectional energization on the second conductive path 92 and an OFF state shutting off energization on the second conductive path 92 in a direction from the second external power source 62 toward the voltage conversion unit 6 side. The second shut-off switch 72 is interposed on the second conductive path 92, and one end side (source) thereof is electrically connected to the voltage conversion unit 6 and one terminal of the second capacitor C2. The other end side (drain) of the second shut-off switch 72 is configured to be electrically connected to the second conductive path 92 on the second external power source 62 side, and to be switched between ON and OFF by the control unit 12. That is, the second shut-off switch 72 is provided on the second conductive path 92 between the second external power source 62 and the voltage conversion unit 6.

The second shut-off switch 72 is a switch S that is interposed between the second external power source 62 and the second capacitor C2. The second shut-off switch 72, when ON, at least allows energization from the second external power source 62 to the voltage conversion unit 6 side, and allows current to flow to the second capacitor C2. The second shut-off switch 72, when OFF, shuts off energization from the second external power source 62 to the voltage conversion unit 6 side, and shuts off the flow of current to the second capacitor C2. A parasitic diode 72A is electrically connected to the second shut-off switch 72. A configuration is adopted in which the anode of the parasitic diode 72A is electrically connected to the voltage conversion unit 6, and the cathode is electrically connected to the second conductive path 92 on the second external power source 62 side.

The first current detection unit 81 is provided on the first conductive path 91 to be interposed between the voltage conversion unit 6 and the first shut-off switch 71. The second current detection unit 82 is provided on the second conductive path 92 to be interposed between the voltage conversion unit 6 and the second shut-off switch 72. The third current detection unit 83 is provided on the reference conductive path 93 to be interposed between the voltage conversion unit 6 and ground G. The first current detection unit 81, the second current detection unit 82 and the third current detection unit 83 are constituted as known current detection circuits that use current transformers, shunt resistor and the like, for example.

The first voltage detection unit (not shown) outputs a value indicating a first voltage of the first conductive path 91 to the control unit 12. The second voltage detection unit (not shown) outputs a value indicating a second voltage of the second conductive path 92 to the control unit 12.

The control unit 12 is constituted as a microcomputer. The control unit 12 performs feedback control by a known method based on a target voltage value and the values respectively indicating the first voltage and second voltage of the first conductive path 91 and second conductive path 92 from the first voltage detection unit and second voltage detection unit. The control unit 12 thereby sets the duty of the PWM signal to be provided to the voltage conversion unit 6. The control unit 12 then outputs the set signal toward the gates of the semiconductor switches T1, T2, T3 and T4 of the voltage conversion unit 6. The control unit 12 performs voltage conversion control in which the semiconductor switches T1, T2, T3 and T4 are turned ON and OFF. The target voltage value may be a value set by the control unit 12, or may be a value instructed by an external device such as an external ECU.

For example, in the case of performing the first conversion operation for stepping down the voltage from the first external power source 61 toward the second external power source 62 or stepping up the voltage from the second external power source 62 toward the first external power source 61, the control unit 12 executes voltage conversion control of the first switch unit S1. At this time, the control unit 12 keeps the semiconductor switch T3 in the ON state, and keeps the semiconductor switch T4 in the OFF state. The semiconductor switches T1 and T2 of the first switch unit S1 turn ON and OFF due to the voltage conversion control being performed, and operate as drive switching elements D1 and D2 that step up or step down the voltage applied to one of the first conductive path 91 and the second conductive path 92 and apply the output voltage to the other thereof.

In the case of performing the second conversion operation for stepping down the voltage from the second external power source 62 toward the first external power source 61 or stepping up the voltage from the first external power source 61 toward the second external power source 62, the control unit 12 executes voltage conversion control of the second switch unit S2. At this time, the control unit 12 keeps the semiconductor switch T1 in the ON state, and keeps the semiconductor switch T2 in the OFF state. The semiconductor switches T3 and T4 of the second switch unit S2 turn ON and OFF due to the voltage conversion control being performed, and operate as drive switching elements D3 and D4 that step up or step down the voltage applied to one of the first conductive path 91 and the second conductive path 92 and apply the output voltage to the other thereof.

Operations of DC-DC Converter

Next, operations of the DC-DC converter 1 of the disclosure will be described.

The control unit 12 executes shut-off control, in the case where an ignition switch (not shown) provided in the vehicle is OFF and an ignition OFF signal indicating that the ignition switch is OFF is being input from a device (external ECU, etc.) provided outside the DC-DC converter 1. Specifically, at this time, the control unit 12 outputs a signal set to L level toward the gates of the semiconductor switches T1, T2, T3 and T4, the first shut-off switch 71 and the second shut-off switch 72. As a result, the semiconductor switches T1, T2, T3 and T4, the first shut-off switch 71 and the second shut-off switch 72 turn OFF. The control unit 12 thus keeps the semiconductor switches T1, T2, T3 and T4, the first shut-off switch 71 (switch S) and the second shut-off switch 72 (switch S) in the OFF state by executing shut-off control. Shut-off control on the first shut-off switch 71 by the control unit 12 is first shut-off control, and shut-off control on the second shut-off switch 72 by the control unit 12 is second shut-off control. At this time, the first capacitor C1 and the second capacitor C2 are not being charged.

Intermittent Control

In the case where the ignition switch (not shown) provided in the vehicle switches from OFF to ON, an ignition ON signal indicating that the ignition switch is ON is input to the control unit 12 from an external ECU or the like. Then, the control unit 12 performs intermittent control in which the first shut-off switch 71 and the second shut-off switch 72 are switched ON intermittently prior to switching to energization control in which the first shut-off switch 71 and the second shut-off switch 72 are kept ON. Specifically, the control unit 12 performs first intermittent control in which the first shut-off switch 71 are switched ON intermittently prior to switching from first shut-off control in which the first shut-off switch 71 is kept OFF to first energization control in which the first shut-off switch 71 is kept ON. Also, the control unit 12 performs second intermittent control in which the second shut-off switch 72 is switched ON intermittently prior to switching from second shut-off control in which the second shut-off switch 72 is kept OFF to second energization control in which the second shut-off switch 72 is kept ON.

Figure 2:
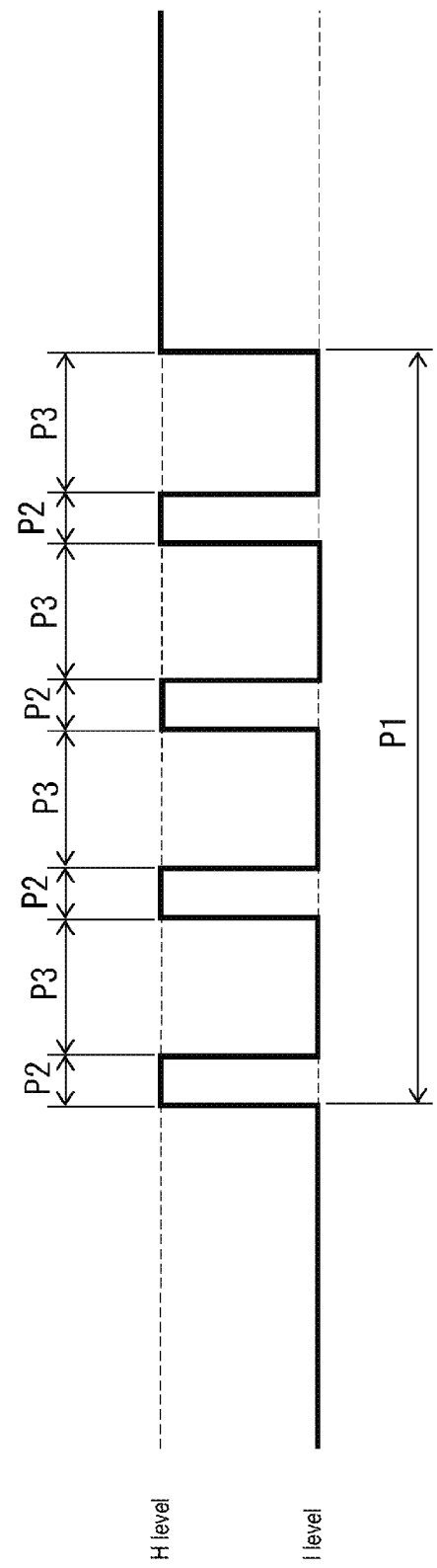
FIG. 2 is a timing chart showing an example of a waveform of a drive signal that is output from a control unit toward a first shut-off switch and a second shut-off switch in first intermittent control and second intermittent control in the DC-DC converter of the first embodiment.
Figure 3:
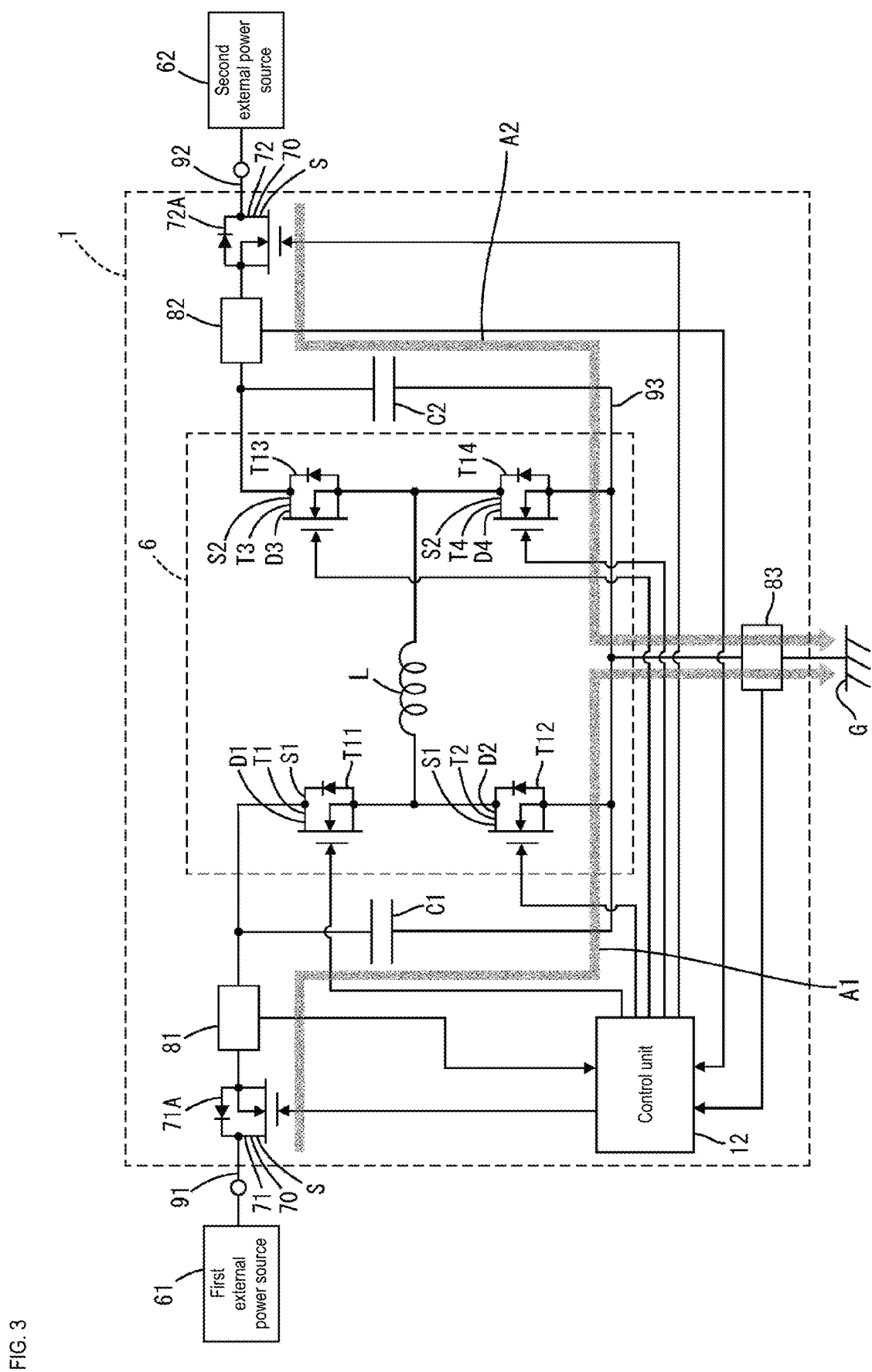
FIG. 3 is a circuit diagram showing the path of current flowing from a second external power source to a second capacitor when the second shut-off switch is ON at the time of executing the second intermittent control, and the path of current flowing from a first external power source to a first capacitor when the first shut-off switch is ON at the time of executing the first intermittent control in the DC-DC converter of the first embodiment.

Specifically, as shown in FIG. 2, in the first intermittent control and the second intermittent control, continuous output of the H level signal for a predetermined period P2 followed by continuous output of the L level signal for a predetermined period P3 is repeatedly performed. The control unit 12 alternately outputs the H level signal and the L level signal repeatedly toward the gates of the first shut-off switch 71 and the second shut-off switch 72 in a period P1 for executing the first intermittent control and the second intermittent control (intermittent control). As a result, the first shut-off switch 71 and the second shut-off switch 72 enter an ON state in which the drain and source are in continuity with each other when the H level signal is being input to the gate. The period P2 of the H level signal is shorter than the period of the H level signal of the PWM signal at the time of voltage conversion control (not shown). That is, the frequency of ON/OFF operation of the first shut-off switch 71 (switch S) and the second shut-off switch 72 (switch S) in the first intermittent control and the second intermittent control (intermittent control) is greater than the frequency of ON/OFF operation of the drive switching elements D1, D2, D3 and D4 (semiconductor switches T1, T2, T3 and T4) in the voltage conversion control. In the second intermittent control, current flows from the second external power source 62 to the second capacitor C2 on the path indicated by arrow A2, as shown in FIG. 3, when the second shut-off switch 72 is ON. In the first intermittent control, current flows from the first external power source 61 to the first capacitor C1 on the path indicated by arrow A1, when the first shut-off switch 71 is ON.

The first shut-off switch 71 and the second shut-off switch 72 enter an OFF state in which the drain and source are not in continuity when the L level signal is being input to the gate. That is, the control unit 12 intermittently sends current from the first external power source 61 to the first capacitor C1, by performing the first intermittent control on the first shut-off switch 71. Also, the control unit 12 intermittently sends current from the second external power source 62 to the second capacitor C2, by performing the second intermittent control on the second shut-off switch 72. As a result, the current (inrush current) flowing through the first capacitor C1 and the second capacitor C2 can be kept from becoming excessively large.

The DC-DC converter 1 is configured such that the first current detection unit 81 can detect current flowing through the first conductive path 91. The DC-DC converter 1 is configured such that the second current detection unit 82 can detect current flowing through the second conductive path 92. The DC-DC converter 1 is configured such that the third current detection unit 83 can detect current flowing to ground G via the first capacitor C1, the second capacitor C2 and the voltage conversion unit 6. Accordingly, the DC-DC converter 1 suppresses detection of excessively large current values in the first current detection unit 81, the second current detection unit 82 and the third current detection unit 83, by keeping the current flowing through the first capacitor C1 and the second capacitor C2 from becoming excessively large.

The first capacitor C1 and the second capacitor C2 then proceed to be charged, and a condition for ending the first intermittent control and the second intermittent control is established. Then, the control unit 12 ends the first intermittent control and the second intermittent control of the first shut-off switch 71 and the second shut-off switch 72, and thereafter starts the first conversion operation or the second conversion operation. Conditions for ending the first intermittent control and the second intermittent control include, for example, the case where the current flowing through the first capacitor C1 and the second capacitor C2 has decreased to less than a predetermined value, and the case where a predetermined time period has elapsed from when the first intermittent control and the second intermittent control were started. The case where the current flowing through the first capacitor C1 and the second capacitor C2 has decreased to less than a predetermined value is, specifically, the case where the current values detected by the first current detection unit 81, the second current detection unit 82 and the third current detection unit 83 have decreased to less than a predetermined threshold value. The control unit 12 then switches to first energization control in which the first shut-off switch 71 is kept ON, and switches to second energization control in which the second shut-off switch 72 is kept ON.

First Conversion Operation

The first conversion operation (operation for stepping up voltage applied to second conductive path 92 and applying resultant voltage to first conductive path 91, and operation for stepping down voltage applied to first conductive path 91 and applying resultant voltage to second conductive path 92) will now be described. The control unit 12 outputs a drive signal toward the voltage conversion unit 6. The drive signal of the first conversion operation is a signal that results from a PWM signal having a form in which dead time is set for the gates of the first switch unit S1 (semiconductor switches T1 and T2 (drive switching elements D1 and D2)) of the voltage conversion unit 6 being output in a complementary manner. The first switch unit S1 (semiconductor switches T1 and T2 (drive switching elements D1 and D2)) performs voltage conversion control with the drive signal. Specifically, voltage conversion control is performed such that an OFF signal (e.g., L level signal) is output to the semiconductor switch T2 (drive switching element D2) during output of an ON signal (e.g., H level signal) to the semiconductor switch T1 (drive switching element D1), and such that an OFF signal (e.g., L level signal) is output to the semiconductor switch T1 (drive switching element D1) during output of an ON signal (e.g., H level signal) to the semiconductor switch T2 (drive switching element D2).

The control unit 12 continuously outputs an ON signal (e.g., H level signal) to the semiconductor switch T3 of the second switch unit S2 and keeps the semiconductor switch T3 in the ON state, when the first switch unit S1 is performing the voltage conversion control. At the same time, the control unit 12 continuously outputs an OFF signal (e.g., L level signal) to the semiconductor switch T4 and keeps the semiconductor switch T4 in the OFF state. As a result of this control, in the case of stepping up the DC second voltage (input voltage) applied to the second conductive path 92 and applying the resultant voltage to the first conductive path 91, an output voltage higher than the second voltage applied to the second conductive path 92 is applied to the first conductive path 91. Also, in the case of stepping down the DC first voltage (input voltage) applied to the first conductive path 91 and applying the resultant voltage to the second conductive path 92, an output voltage lower than the first voltage applied to the first conductive path 91 is applied to the second conductive path 92.

Second Conversion Operation

The second conversion operation (operation for stepping down voltage applied to second conductive path 92 and applying resultant voltage to first conductive path 91, and operation for stepping up voltage applied to first conductive path 91 and applying resultant voltage to second conductive path 92) will now be described. The control unit 12 outputs a drive signal toward the voltage conversion unit 6. The drive signal of the second conversion operation is a signal that results from a PWM signal having a form in which dead time is set for the gates of the second switch unit S2 (semiconductor switches T3 and T4 (drive switching elements D3 and D4)) of the voltage conversion unit 6 being output in a complementarily manner. The second switch unit S2 (semiconductor switches T3 and T4 (drive switching elements D3 and D4)) performs voltage conversion control with the drive signal. Specifically, voltage conversion control is performed such that an OFF signal (e.g., L level signal) is output to the semiconductor switch T4 (drive switching element D4) during output of an ON signal (e.g., H level signal) to the semiconductor switch T3 (drive switching element D3), and such that an OFF signal (e.g., L level signal) is output to the semiconductor switch T3 (drive switching element D3) during the output of an ON signal (e.g., H level signal) to the semiconductor switch T4 (drive switching element D4).

The control unit 12 continuously outputs an ON signal (e.g., H level signal) to the semiconductor switch T1 of the first switch unit S1 and keeps the semiconductor switch T1 in the ON state, when the second switch unit S2 is performing the voltage conversion control. At the same time, the control unit 12 continuously outputs an OFF signal (e.g., L level signal) to the semiconductor switch T2 and keeps the semiconductor switch T2 in the OFF state. As a result of this control, in the case of stepping down the DC second voltage (input voltage) applied to the second conductive path 92 and applying the resultant voltage to the first conductive path 91, an output voltage lower than the second voltage applied to the second conductive path 92 is applied to the first conductive path 91. Also, in the case of stepping up the DC first voltage (input voltage) applied to the first conductive path 91 and applying the resultant voltage to the second conductive path 92, an output voltage higher than the first voltage applied to the first conductive path 91 is applied to the second conductive path 92.

In the period during which the first intermittent control and the second intermittent control are not performed, the control unit 12 switches the first shut-off switch 71 or the second shut-off switch 72 to OFF in the case where a current at or above a predetermined threshold is flowing through either the first conductive path 91 or the second conductive path 92. Specifically, the control unit 12 switches the first shut-off switch 71 or the second shut-off switch 72 to OFF in the case where the current values detected by the first current detection unit 81, the second current detection unit 82 and the third current detection unit 83 are greater than or equal to a predetermined threshold value.

In the period during which the first intermittent control and the second intermittent control are not performed, the control unit 12 switches the first shut-off switch 71 or the second shut-off switch 72 to OFF in the case where a voltage at or below a predetermined threshold value is flowing through either the first conductive path 91 or the second conductive path 92. Specifically, the control unit 12 switches the first shut-off switch 71 or the second shut-off switch 72 to OFF in the case where the voltage values detected by the first voltage detection unit and the second voltage detection unit are less than or equal to a predetermined threshold value.

Next, the effects of this configuration will be illustrated. The DC-DC converter 1 of the disclosure includes the voltage conversion unit 6, the first capacitor C1, the second capacitor C2, the first shut-off switch 71, the second shut-off switch 72 and the control unit 12. The voltage conversion unit 6 is provided between the first conductive path 91 and the second conductive path 92. The first capacitor C1 is provided between the first conductive path 91 and the reference conductive path 93. The second capacitor C2 is provided between the second conductive path 92 and the reference conductive path 93. The control unit 12 switches the first shut-off switch 71 and the second shut-off switch 72 to ON and OFF.

Flow of current from the first external power source 61 to the first capacitor C1 is shut off when the first shut-off switch 71 is OFF. Current is at least allowed to flow from the first external power source 61 to the first capacitor C1 via the first conductive path 91 when the first shut-off switch 71 is ON. Flow of current from the second external power source 62 to the second capacitor C2 is shut off when the second shut-off switch 72 is OFF. Current is at least allowed to flow from the second external power source 62 to the second capacitor C2 via the second conductive path 92 when the second shut-off switch 72 is ON. The control unit 12 performs intermittent control in which the first shut-off switch 71 and the second shut-off switch 72 are intermittently turned ON prior to energization control in the case of switching from shut-off control to energization control. Shut-off control keeps the first shut-off switch 71 and the second shut-off switch 72 in the OFF state. Energization control keeps the first shut-off switch 71 and the second shut-off switch 72 in the ON state.

The DC-DC converter 1 of the disclosure executes intermittent control at the time of switching the first shut-off switch 71 and the second shut-off switch 72 from shut-off control to energization control. Thus, the DC-DC converter 1 is able to better suppress inrush current flowing through the first capacitor C1 and the second capacitor C2 than in the case of starting the energization control at the end timing of the shut-off control. Therefore, with the DC-DC converter 1, problems caused by excessive inrush current flowing through the first capacitor C1 and the second capacitor C2 at the time of releasing the shut-off control can be made less likely to occur.

The switch of the DC-DC converter 1 of the disclosure includes the first shut-off switch 71 provided on the first conductive path 91 between the first external power source 61 and the voltage conversion unit 6 and the second shut-off switch 72 provided on the second conductive path 92 between the second external power source 62 and the voltage conversion unit 6. The first shut-off switch 71 allows energization from the first external power source 61 side to the voltage conversion unit 6 side when ON, and shuts off energization from the first external power source 61 side to the voltage conversion unit 6 side when OFF. The second shut-off switch 72 allows energization from the second external power source 62 side to the voltage conversion unit 6 side when ON, and shuts off energization from the second external power source 62 side to the voltage conversion unit 6 side when OFF.

The control unit 12 performs first intermittent control in which the first shut-off switch 71 is switched ON intermittently prior to the first energization control in the case of switching from first shut-off control in which the first shut-off switch 71 is kept OFF to first energization control in which the first shut-off switch 71 is kept ON. The control unit 12 performs second intermittent control in which the second shut-off switch 72 is switched ON intermittently prior to the second energization control in the case of switching from second shut-off control in which the second shut-off switch 72 is kept OFF to second energization control in which the second shut-off switch 72 is kept ON.

According to this configuration, the DC-DC converter 1 can achieve protection on the first conductive path 91 and the second conductive path 92 by providing a shut-off switch (first shut-off switch 71, second shut-off switch 72) on both conductive paths. Furthermore, the DC-DC converter 1 is able to suppress inrush current flowing from the external power sources (first external power source 61, the second external power source 62) to the first capacitor C1 and the second capacitor C2, even in the case where the shut-off control is released by the shut-off switch of one of the first conductive path 91 and the second conductive path 92, while realizing such a protection function.

The voltage conversion unit 6 of the DC-DC converter 1 of the disclosure includes the drive switching elements D1, D2, D3 and D4. The DC-DC converter 1 steps up or steps down the voltage applied to one of the first conductive path 91 and second conductive path 92 in response to ON/OFF operation of the drive switching elements D1, D2, D3 and D4, and applies the output voltage to the other thereof. The control unit 12 performs voltage conversion control in which the drive switching elements D1, D2, D3 and D4 are turned ON and OFF. The control unit 12 increases the frequency of ON/OFF operation of the switch S in intermittent control to be greater than the frequency of ON/OFF operation of the drive switching elements D1, D2, D3 and D4 in the voltage conversion control.

According to this configuration, this DC-DC converter 1 is able to increase the frequency of ON/OFF operation of the switch S at the time of intermittent control to be greater than the frequency of ON/OFF operation of the drive switching elements D1, D2, D3 and D4 at the time of voltage conversion control. That is, the DC-DC converter 1 is able to further shorten each ON period during intermittent control, and is able to further reduce current flowing through the first capacitor C1 and the second capacitor C2 in each ON period during intermittent control. Therefore, the DC-DC converter 1 is able to more reliably suppress inrush current to the first capacitor C1 and the second capacitor C2.

The first capacitors C1 and the second capacitor C2 of the DC-DC converter 1 of the disclosure are ceramic capacitors.

Since ceramic capacitors have a low internal resistance compared with electrolytic capacitors, inrush current tends to readily increase compared with electrolytic capacitors. Thus, the DC-DC converter 1 is able to favorably suppress the magnitude of the inrush current to the first capacitor C1 and the second capacitor C2 in one ON state by performing intermittent control, even in the case where ceramic capacitors are used.

The reference conductive path 93 of the DC-DC converter 1 of the disclosure is a conductive path that is kept at a reference potential lower than the potential of one of the conductive paths (first conductive path 91 or second conductive path 92).

The control unit of the DC-DC converter of the disclosure switches at least one of the first shut-off switch 71 and the second shut-off switch 72 to OFF in the case where the current rises to a threshold value or the voltage falls to a threshold value on one of the conductive paths (first conductive path 91 or second conductive path 92).

Second Embodiment

Next, a DC-DC converter 2 of a second embodiment will be described with reference to FIG. 4. The DC-DC converter 2 differs from the first embodiment in that a first external power source and a first shut-off switch are not provided, and in that intermittent control on the semiconductor switch T3 of the voltage conversion unit 6 is performed prior to executing the first conversion operation. The same reference signs are given to configuration that is the same, and description of the structure, operation and effect thereof will be omitted.

Overview of DC-DC Converter 2

A first external power source is not connected to a first conductive path 91 of the DC-DC converter 2. A load 7 is connected to the first conductive path 91. The load 7 is configured to receive power supply from a second external power source 62, for example. The load 7 is a known in-vehicle electrical component, and is not particularly limited in type.

Operations of DC-DC Converter

Operations of the DC-DC converter 2 will now be described.

A control unit 12 performs intermittent control on a second shut-off switch 72 when an ignition signal indicating that the ignition switch is ON is input from an external ECU or the like.

Intermittent Control of Second Shut-off Switch

The control unit 12 performs intermittent control on the second shut-off switch 72 (switch S). Specifically, this intermittent control is the same as the second intermittent control (intermittent control) of the second shut-off switch 72 in the first embodiment. A second capacitor C2 then proceeds to be charged, and when a condition for ending the intermittent control is established, the control unit 12 ends the intermittent control on the second shut-off switch 72, and keeps the second shut-off switch 72 in an ON state. Conditions for ending the intermittent control include, for example, the case where the current flowing through the second capacitor C2 has decreased to less than a predetermined value, and the case where a predetermined time period has elapsed from when the intermittent control was started. The case where the current flowing through the second capacitor C2 has decreased to less than a predetermined value is, specifically, the case where the current values detected by a second current detection unit 82 and a third current detection unit 83 have decreased to less than a predetermined threshold value.

Intermittent Control of Semiconductor Switching Element

In a state where the second shut-off switch 72 is kept ON, a semiconductor switch T3 is interposed between the second external power source 62 and a first capacitor C1. The control unit 12 performs intermittent control on the semiconductor switch T3 prior to performing a first conversion operation (operation for stepping up voltage applied to second conductive path 92 and applying resultant voltage to first conductive path 91). During the first conversion operation, the semiconductor switch T3 is kept ON without undergoing voltage conversion control. In the first conversion operation, the semiconductor switch T3 is a switch S forming part of a voltage conversion unit 6.

First, the control unit 12 alternately outputs an H level signal and a L level signal repeatedly toward the gate of the semiconductor switch T3 (switch S). As a result, the semiconductor switch T3 enters an ON state in which the drain and source are in continuity when the H level signal is being input to the gate, and enters an OFF state in which the drain and source are not in continuity when the L level signal is being input to the gate. At this time, the control unit 12 continuously outputs the L level signal to semiconductor switches T1, T2 and T4. As a result, the semiconductor switches T1, T2 and T4 enter an OFF state in which the drain and source are not in continuity.

Figure 4:
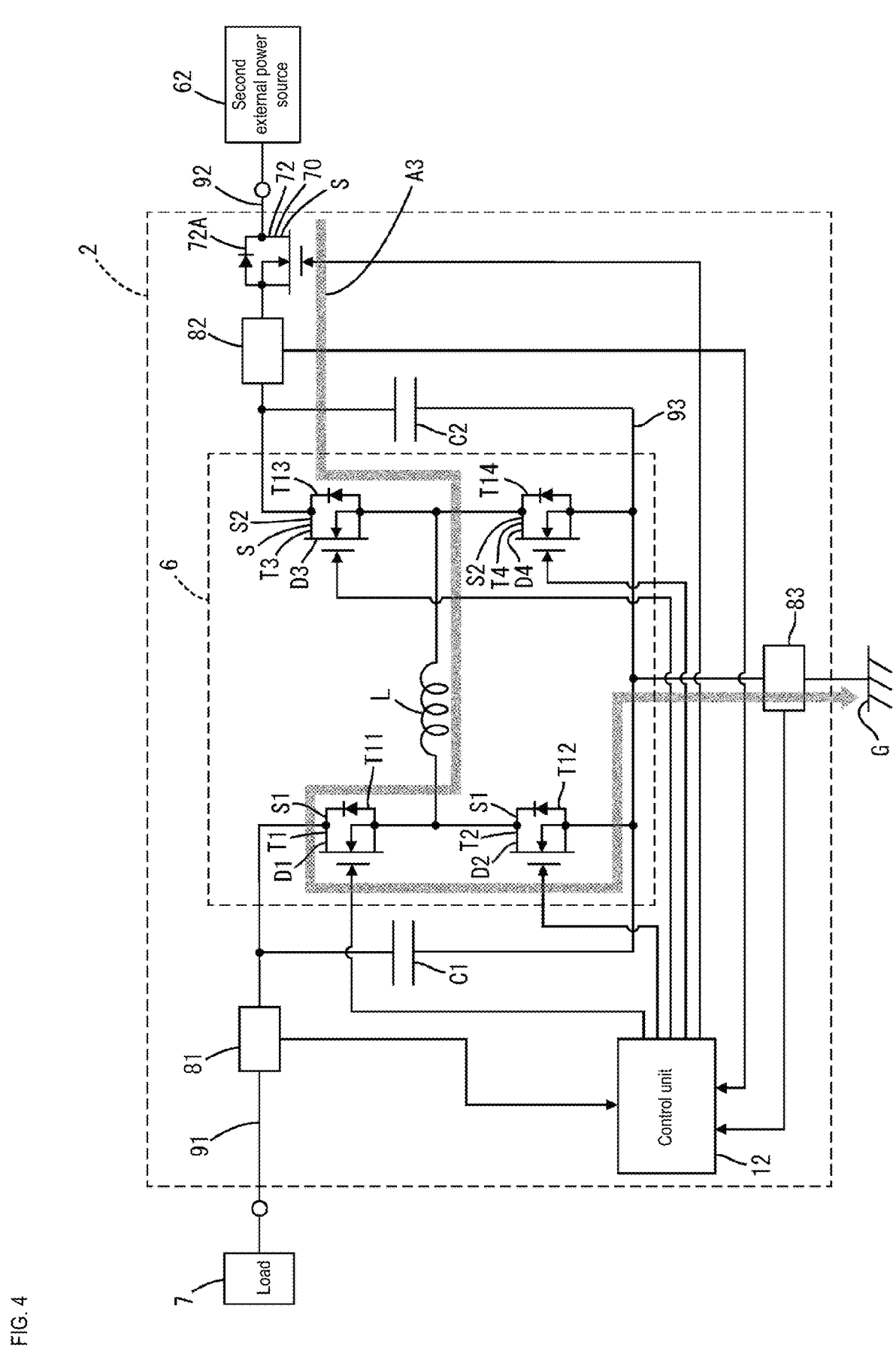
FIG. 4 is a circuit diagram showing a DC-DC converter of a second embodiment.

When the semiconductor switch T3 is ON in intermittent control, current flows from the second external power source 62 to the first capacitor C1 on the path indicated by arrow A3 in FIG. 4. Although the semiconductor switch T1 is OFF at this time, current flows toward the first conductive path 91 via a parasitic diode T11. The semiconductor switch T3 then enters an OFF state in which the drain and source are not in continuity when the L level signal is being input to the gate. As a result, current does not flow from the second external power source 62 toward the first capacitor C1. That is, by performing intermittent control on the semiconductor switch T3 with the control unit 12, current is sent intermittently from the second external power source 62 to the first capacitor C1. As a result, the current flowing through the first capacitor C1 can be kept from becoming excessively large. The signal output to the semiconductor switch T3 when intermittent control is being performed is similar to FIG. 2. The frequency of ON/OFF operation of the second shut-off switch 72 (switch S) and the semiconductor switch T3 (switch S) in intermittent control is greater than the frequency of ON/OFF operation of drive switching elements D1, D2, D3 and D4 (semiconductor switches T1, T2, T3 and T4) in voltage conversion control.

The DC-DC converter 2 is configured such that the first current detection unit 81 can detect current flowing through the first conductive path 91. The DC-DC converter 2 is configured such that the second current detection unit 82 can detect current flowing through the second conductive path 92. The DC-DC converter 2 is configured such that the third current detection unit 83 can detect current flowing to ground G via the first capacitor C1, the second capacitor C2, and the voltage conversion unit 6. Accordingly, the DC-DC converter 2 suppresses detection of excessively large current values in the first current detection unit 81, the second current detection unit 82 and the third current detection unit 83, by keeping the current flowing through the first capacitor C1 and the second capacitor C2 from becoming excessively large. The first capacitor C1 then proceed to be charged, and when a condition for ending intermittent control of the semiconductor switch T3 is established, the control unit 12 ends intermittent control of the semiconductor switch T3. Conditions for ending intermittent control include, for example, the case where the current flowing through the first capacitor C1 has decreased to less than a predetermined value, and the case where a predetermined time period has elapsed from when the intermittent control was started. The case where the current flowing through the first capacitor C1 has decreased to less than a predetermined value is, specifically, the case where the current values detected by the first current detection unit 81, the second current detection unit 82 and the third current detection unit 83 have decreased to less than a predetermined threshold value. The control unit 12 ends intermittent control of the semiconductor switch T3 (switch S) by continuously outputting an ON signal (e.g., H level signal) to the semiconductor switch T3 and keeping the semiconductor switch T3 in the ON state.

First Conversion Operation

The control unit 12 continuously outputs an ON signal (e.g., H level signal) to the semiconductor switch T3 to keep the semiconductor switch T3 in the ON state, and continuously outputs an OFF signal (e.g., L level signal) to the semiconductor switch T4 to keep the semiconductor switch T4 in the OFF state. Furthermore, the control unit 12 outputs a drive signal toward the first switch unit S1 (drive switching elements D1, D2) and performs voltage conversion control on the first switch unit S1. The DC-DC converter 2 thus starts the first conversion operation. As a result of this control, the DC second voltage (input voltage) applied to the second conductive path 92 is stepped up, and an output voltage higher than the second voltage applied to the second conductive path 92 is applied to the first conductive path 91.

Second Conversion Operation

The control unit 12 performs voltage conversion control on a second switch unit S2, in the case of performing a second conversion operation (operation for stepping down voltage applied to second conductive path 92 and applying resultant voltage to first conductive path 91). During the voltage conversion control of the second conversion operation, the semiconductor switches T3 and T4 (drive switching elements D3 and D4) turn ON and OFF. The semiconductor switch T3 at this time is able to send current intermittently from the second external power source 62 to the first capacitor C1, similarly to when the semiconductor switch T3 is executing intermittent control. As a result, the current flowing through the first capacitor C1 can be kept from becoming excessively large. That is, when the DC-DC converter 2 executes the second conversion operation, the semiconductor switch T3 sends current intermittently from the second external power source 62 to the first capacitor C1 without performing intermittent control, due to the second switch unit S2 (semiconductor switches T3, T4 (drive switching elements D3, D4)) performing a voltage conversion operation. The DC second voltage (input voltage) applied to the second conductive path 92 is then stepped down by continuing the voltage conversion operation even after the first capacitor C1 has proceeded to be charged, and an output voltage lower than the second voltage applied to the second conductive path 92 is applied to the first conductive path 91.

Next, the effects of this configuration will be illustrated.

The switch S of the DC-DC converter 2 of the disclosure includes the second shut-off switch 72 provided on the second conductive path 92 between the second external power source 62 and the voltage conversion unit 6. The second shut-off switch 72 allows energization from the second external power source 62 side to the voltage conversion unit 6 side when ON, and shuts off energization from the second external power source 62 side to the voltage conversion unit 6 side when OFF.

According to this configuration, the DC-DC converter 2 is able to suppress excessive current at the time of shut-off control release using the second shut-off switch 72 necessary for a protection function while keeping special dedicated components and the like from increasing in number. Therefore, the DC-DC converter 2 is able to suppress inrush current to the second capacitor C2 with a simpler configuration.

The switch S of the DC-DC converter 2 of the disclosure includes the semiconductor switch T3 forming part of the voltage conversion unit 6.

According to this configuration, the DC-DC converter 2 is able to suppress excessive current at the time of shut-off control release using the semiconductor switch T3 necessary for realizing the functions of the voltage conversion unit 6, while keeping special dedicated components and the like from increasing in number. Therefore, the DC-DC converter 2 is able to suppress inrush current to the first capacitor C1 with a simpler configuration.

Other Embodiments

This configuration is not limited to the embodiments illustrated with the above description and drawings, and embodiments such as the following, for example, are also included in the technical scope of the invention.

In the second embodiment, charging of the second capacitor C2 and the first capacitor C1 from the second external power source 62 by intermittent control is disclosed, but a configuration may be adopted in which a second external power source and a second shut-off switch are not provided, and a first external power source and a first shut-off switch are provided. In this case, the control unit charges the first capacitor such that excessively large current does not flow through the first capacitor by performing intermittent control on the first shut-off switch. After the first capacitor has proceeded to be charged, intermittent control is then performed on a first high-side element of the first switch unit is prior to performing a second conversion operation (operation for stepping up voltage applied to first conductive path and applying resultant voltage to second conductive path).

At this time, the control unit continuously outputs an L level signal to the other semiconductor switches. In this case, the first high-side element of the first switch unit is a switch forming part of the voltage conversion unit. The control unit charges the second capacitor such that excessively large current does not flow through the second capacitor by performing intermittent control on the first high-side element of the first switch unit. Although a second high-side element of the second switch unit is OFF at this time, current flows toward the second conductive path via a parasitic diode. The second capacitor then proceeds to be charged, and when a condition for ending intermittent control in the first high-side element of the first switch unit is established, the control unit continuously outputs an ON signal (e.g., H level signal) to the first high-side element of the first switch unit. As a result, the first high-side element of the first switch unit is kept ON, and the second conversion operation is executed after ending intermittent control of the first high-side element (switch) of the first switch unit.

The control unit performs voltage conversion control on the first switch unit, in the case of performing a first conversion operation (operation for stepping down voltage applied to first conductive path and applying resultant voltage to second conductive path). The first high-side element of the first switch unit at this time is able to send current intermittently from the first external power source to the second capacitor, similarly to when the first high-side element is executing intermittent control. As a result, the current flowing through the second capacitor can be kept from becoming excessively large. In this case, at the time of executing the first conversion operation, current is sent intermittently from the first external power source to the second capacitor without the first high-side element of the first switch unit performing intermittent control, due to the first switch unit performing the voltage conversion operation.

Figure 5:
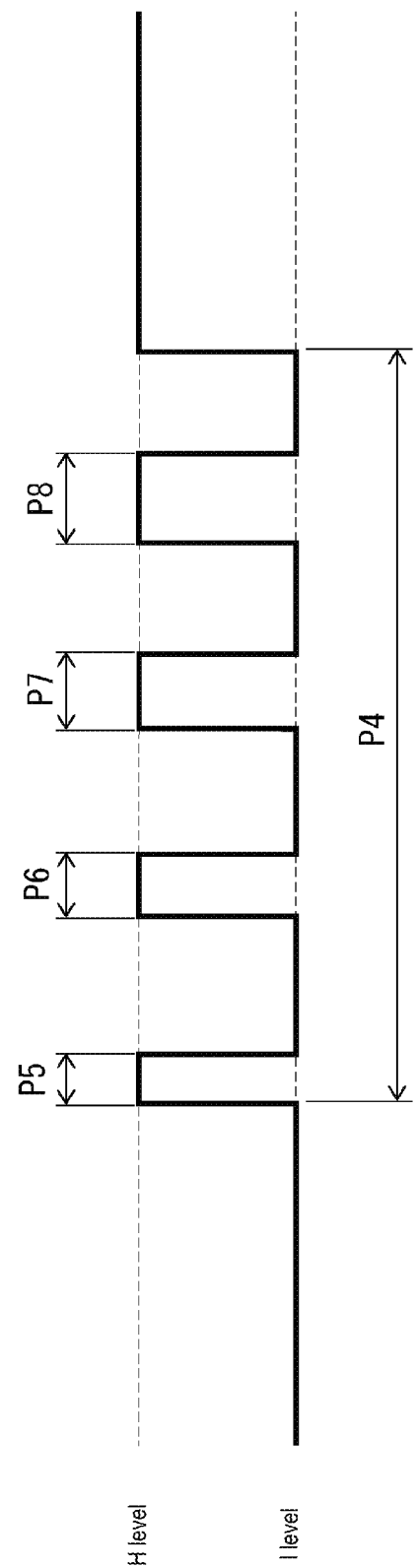
FIG. 5 is an example of a waveform of a drive signal that is output from a control unit toward a first shut-off switch, a second shut-off switch and semiconductor switches in intermittent control in a DC-DC converter of another embodiment.

The first and second embodiments disclose that the period P2 of the H level signal that is output from the control unit 12 to the first shut-off switch 71, the second shut-off switch 72 and the semiconductor switch T3 in the intermittent control is constant. The disclosure is not limited thereto, and the ON period of the switch in a partial period of the entire period for performing intermittent control may be set to longer than the ON period of the switch in periods earlier than the partial period. Specifically, as shown in FIG. 5, the ON period of the switch in a partial period P8 of the entire period P4 for performing intermittent control may be set to longer than the ON period of the switch in periods P5, P6 and P7 earlier than the partial period P8. In the case where the period of each ON state (hereinafter, also referred to as the ON period) is constant in the intermittent control, the current flowing through the capacitor in each ON period decreases as the ON state is repeated. This phenomenon contributes to lengthening the charging time of the capacitor. In contrast, this DC-DC converter sets the ON period to be relatively longer in partial periods that are relatively later, and is thus able to suppress the decrease in current caused by repetition of the ON state. Therefore, the DC-DC converter is able to complete charging of the capacitor earlier, while realizing the function of suppressing inrush current to the capacitor.

In the first and second embodiments, a bidirectional step-up/down DC-DC converter is illustrated as an example of the DC-DC converter, but the DC-DC converter may be a step-down DC-DC converter, may be a step-up DC-DC converter, or may be a step-up/down DC-DC converter. Also, the DC-DC converter may be a bidirectional DC-DC converter that can change the input side and the output side as shown in Example 1, or may be a unidirectional DC-DC converter in which the input side and the output side are fixed.

In the first and second embodiments, N-channel MOSFETs are used for the semiconductor switches T2 and T4, but a diode rectification method may be employed using a diode in one or both thereof.

In the first and second embodiments, the control unit 12 is constituted with a microcomputer as a main constituent, but may be realized by a plurality of hardware circuits other than a microcomputer.

The first embodiment 1 discloses that the frequency of ON/OFF operation of the first shut-off switch 71 and the second shut-off switch 72 (switch S) in intermittent control is greater than the frequency of ON/OFF operation of the semiconductor switches T1, T2, T3 and T4 in voltage conversion control. The disclosure is not limited thereto, and the frequency of ON/OFF operation of the first shut-off switch and the second shut-off switch (switch) in intermittent control may be comparable to the frequency of ON/OFF operation of the semiconductor switch in voltage conversion control. Also, the respective frequencies of ON/OFF operation of the first shut-off switch and the second shut-off switch in intermittent control may differ.

The embodiments disclosed herein are considered in all respects to be illustrative and not restrictive. The scope of the invention is defined by the claims and is not limited to the embodiments disclosed herein, and all changes that come within the meaning and range of equivalency of the claims are intended to be embraced therein.

The invention claimed is:

1. A DC-DC Converter comprising:
a voltage conversion unit provided between a first conductive path and a second conductive path;
a capacitor unit provided between one of the first conductive path and the second conductive path and a reference conductive path,
a switch unit interposed between an external power source and the capacitor; and
a control unit configured to switch the switch unit between an ON state and an OFF state,
wherein flow of current from the external power source to the capacitor unit is shut off when the switch unit is in the OFF state, and current is at least allowed to flow from the external power source to the capacitor unit via the first conductive path when the switch unit is in the ON state,
the control unit, in a case of switching from shut-off control in which the switch unit is kept in the OFF state to energization control in which the switch unit is kept in the ON state, performs intermittent control in which the switch unit is intermittently switched to the ON state prior to the energization control,
the capacitor unit includes a first capacitor provided between the first conductive path and the reference conductive path,
the external power source includes a first external power source connected to the first conductive path,
the switch unit includes a first shut-off switch provided on the first conductive path between the first external power source and the voltage conversion unit,
the first shut-off switch is interposed between the first external power source and the first capacitor,
the first shut-off switch allows energization from the first external power source to the voltage conversion unit when in the ON state, and shuts off energization from the first external power source to the voltage conversion unit when in the OFF state,
the control unit, in a case of switching from a first shut-off control in which the first shut-off switch is kept in the OFF state to a first energization control in which the first shut-off switch is kept in the ON state, performs a first intermittent control which is the intermittent control in which the first shut-off switch is intermittently switched to the ON state prior to the first energization control,
the voltage conversion unit includes a drive switching element, and steps up or steps down a voltage applied to the first conductive path in response to ON/OFF operation of the drive switching element and applies an output voltage to the second conductive path, and
the control unit performs a voltage conversion control in which the drive switching element is switched ON/OFF, sets a frequency of ON/OFF operation of the first shut-off switch in the first intermittent control that is greater than a frequency of ON/OFF operation the drive switching element during the voltage conversion control, and performs the voltage conversion control after the first intermittent control has ended.

2. The DC-DC converter according to claim 1, wherein at least one of the first capacitor and the second capacitor is a ceramic capacitor.

3. The DC-DC converter according to claim 1, wherein the control unit sets an ON period of the switch unit during a partial period of an entire period for performing the intermittent control to longer than the ON period of the switch unit during a period earlier than the partial period.

4. The DC-DC converter according to claim 3, wherein at least one of the first capacitor and the second capacitor is a ceramic capacitor.

5. The DC-DC converter according to claim 1, wherein the voltage conversion unit includes a semiconductor switch.

6. The DC-DC converter according to claim 5, wherein the control unit sets an ON period of the switch unit during a partial period of an entire period for performing the intermittent control to longer than the ON period of the switch unit during a period earlier than the partial period.

7. The DC-DC converter according to claim 5, wherein at least one of the first capacitor and the second capacitor is a ceramic capacitor.

8. The DC-DC converter according to claim 1, wherein the capacitor unit includes a second capacitor provided between the second conductive path and the reference conductive path,
the external power source includes a second external power source connected to the second conduction path,
the switch unit includes a second shut-off switch provided on the second conductive path between the second external power source and the voltage conversion unit,
the second shut-off switch is interposed between the second external power source and the second capacitor,
the second shut-off switch allows energization from the second external power source side to the voltage conversion unit side when in the ON state, and shuts off energization from the second external power source side to the voltage conversion unit side when in the OFF state, and
the control unit, in a case of switching from a second shut-off control in which the second shut-off switch is kept in the OFF state to a second energization control in which the second shut-off switch is kept in the ON state, performs a second intermittent control which is the intermittent control in which the second shut-off switch is intermittently switched to the ON state prior to the second energization control, sets a frequency of ON/OFF operation of the second shut-off switch in the second intermittent control to greater than a frequency of ON/OFF operation the drive switching element during the voltage conversion control, and performs the voltage conversion control after the second intermittent control has ended.

9. The DC-DC converter according to claim 8, wherein the voltage conversion unit includes a semiconductor switch.

10. The DC-DC converter according to claim 8, wherein the control unit sets an ON period of the switch unit during a partial period of an entire period for performing the intermittent control to longer than the ON period of the switch unit during a period earlier than the partial period.

11. The DC-DC converter according to claim 8, wherein at least one of the first capacitor and the second capacitor is a ceramic capacitor.

* * * * *